United States Patent Office 3,201,465
Patented Aug. 17, 1965

3,201,465
CYCLIC AMINOBORANE COMPOUNDS
Michael Peter Brown and Howard Bernard Silver, Surrey, England, assignors to United States Borax & Chemical Corporation, Los Angeles, Calif.
No Drawing. Filed Jan. 17, 1963, Ser. No. 252,032
Claims priority, application Great Britain, Mar. 20, 1962, 10,708/62
16 Claims. (Cl. 260—551)

This invention relates to boron compounds and in particular to novel cyclic aminoboranes.

There are therefore provided, in accordance with this invention, the novel aminoboranes having the following structures:

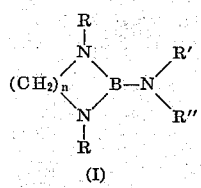

(I)

and

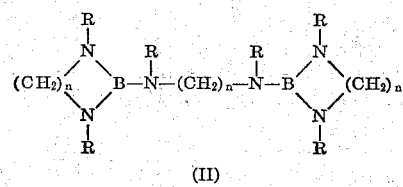

(II)

wherein R is selected from the group consisting of alkyl of 1 to 8 carbon atoms, cycloalkyl in which the ring contains 5–7 carbon atoms, and aryl; R' is selected from the group consisting of hydrogen and alkyl of 1 to 5 carbon atoms; R" is an alkyl of 1 to 5 carbon atoms; and $n$ is an integer selected from 2 and 3.

Illustrative examples of groups represented by R are the alkyl groups, straight or branched chain, such as methyl, ethyl, propyl, isopropyl, butyl, tert.-butyl, secpentyl, hexyl and octyl, as well as the cycloalkyl groups such as cyclopentyl, cyclohexyl and cycloheptyl. R can also represent an aryl group, especially the monocyclic aryl groups such as phenyl and nuclear substituted phenyl. Typical nuclear substituents are lower alkyl and alkoxy, such as methyl, ethyl and methoxy and the halo radicals, such as chloro and bromo.

Typical examples of alkyl groups which can be represented by R' and R" in the above formulae are methyl, ethyl, propyl, isopropyl, butyl, pentyl, sec-pentyl, and the like.

When $n$ represents 2 in the above formulae, the compounds are derivatives of 1,3,2-diazaborolidine and when $n$ represents 3, the compounds are derivatives of 1,3,2-diazaborinane. Representative examples of the compounds of the present invention include 2-dimethylamino-1,3-dimethyl-1,3,2-diazaborinane
N,N'-dimethyl-N,N'-bis(1,3-dimethyl-1,3,2-diazaborinyl) trimethylenediamine
2-dimethylamino-1,3-diisopropyl-1,3,2-diazaborolidine
N,N'-diisopropyl-N,N'-bis(1,3-diisopropyl-1,3,2-diazaborolo)ethylenediamine
2-dimethylamino-1,3-di-tert.-butyl-1,3,2-diazaborolidine
2-di-n-butylamino-1,3-diethyl-1,3,2-diazaborinane
2-diethylamino-1,3-dicyclohexyl-1,3,2-diazaborolidine
2-di-n-hexylamino-1,3-diphenyl-1,3,2-diazaborolidine The new compounds can be prepared by transamination reaction between a tris(monoalkylamino)borane or a tris(dialkylamino)borane and an N,N'-disubstituted ethylene- or trimethylene-diamine. Generally speaking, such a transamination will occur most readily and completely when the diamine is less volatile than the amine corresponding to the tris(alkylamino)borane, and this represents a preferred aspect of the invention. According to the conditions employed, the reaction will give as the main product a compound of structure I or II, as represented by the following equations:

(a)

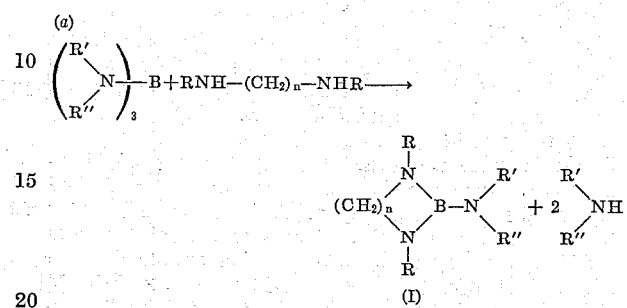

(I)

in which R, R', R' and $n$ have the significance previously assigned.

It is believed that compounds of structures II are then formed by going through an intermediate compound III, as represented by the following equations:

(b)

I + RNH—(CH$_2$)$_n$—NHR ⟶

(III)

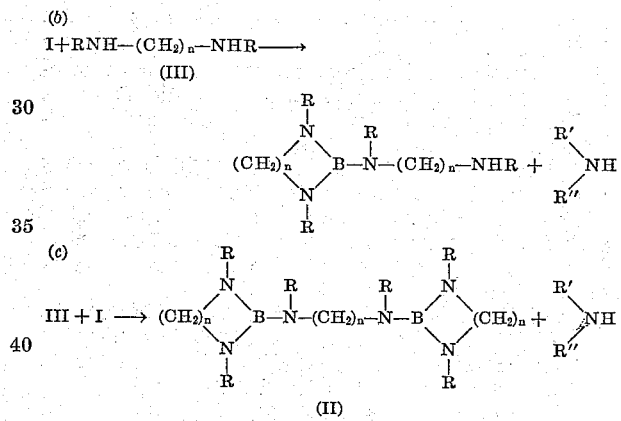

(II)

in which R, R', R" and $n$ have the significance previously assigned.

The reaction conditions and nature of the reactants will influence the course of the reaction towards the various possible porducts. For example, if substantially equimolar proportions of the reactants, or less advantageously, an excess of the tris(alkylamino)borane, are used, the main product will be of type I; on the other hand, if the diamine is in excess, preferably in a molar ratio to the tris(alkylamino)borane of about 3:2, formation of a compound of structure II is favored, with a compound of structure III as an intermediate. As for reaction periods, it appears that reaction (a) is relatively fast, while reactions (b) and (c) are very considerably slower. If, therefore, the process is interrupted, e.g., by cooling the reactants, at an early stage, the production of a compound of type I is favored.

The nature of the reactants will also influence the course of the reactions. Thus, if the size of the N-substituent of the diamine (represented above by R) is bulky, e.g., is a secondary or tertiary alkyl group or a cyclic group, reactions (b) and (c) are much hindered and the main or sole product will usually be a compound of type I. This effect may be sufficiently great to overcome a contrary effect due to the molecular ratio of the reactants or even a long reaction time, its magnitude varying with the size of the substituent group R.

The presence of a catalyst will uusally greatly accelerate all three stages of the reaction, and in so doing favor the production of a compound of type II, even under conditions which in the absence of a catalyst would give a compound of type I as substantially the sole or main product. As a catalyst there can be used an amine salt of a strong acid such as the mineral acids, which can be added as such or formed in situ by adding an anhydrous strong acid. Examples of suitable acids are hydrogen chloride and sulfuric acid, especially the former. The amount of amine salt, whether added as such or formed in situ, is preferably 0.1 to 5% of the weight of the whole reaction mixture. The reaction should be effected in the absence of water and oxygen. Thus, the reactants and any catalyst used should be anhydrous, and the reaction take place in an atmosphere of a dry inert gas, e.g., dry nitrogen or dry argon or other of the so-called Noble gases.

To carry out the reaction, the reactants and catalyst, if one is used, are heated to a temperature of 100°–210° C., and preferably 140°–200° C. If it is desired to stop the reaction at any point, for example in order to produce a compound of type I as the sole or main product, this may be done by causing or allowing the temperature to drop below 100° C., such as to 50°–80° C. or lower. The process can be followed by observing the amount of by-product amine formed; thus, if the product is to be a compound of type I, the reaction can be stopped, as by cooling the reactants as already described, when two molecular proportions of amine have been liberated for each molecular proportion of tris(alkylamino)borane or diamine used as starting material.

The products, of whichever structure, can be separated from the reaction mixture by conventional means, such as, for example, fractional distillation and crystallization.

The new compounds are useful as additives to leaded motor fuels, in that they tend to reduce the formation of combustion chamber deposits and reduce the effect of such deposits as are still formed. When incorporated in lubricating oils they have valuable anti-corrosive properties.

The following examples are presented to illustrate the preparation of typical compounds of this invention, but it is to be understood that the invention is not to be limited to the specific examples given.

*Example 1*

A flask which was fitted with a reflux condenser and, in series therewith, a trap cooled to −78° C. was flushed out with dry nitrogen, and a mixture of tris(dimethylamino)borane (8.5 g.; 0.06 mole) and N,N′-dimethyltrimethylenediamine (9.1 g.; 0.09 mole) was introduced. The mixture was heated to 160° C. for one hour, after which time 6.2 g. (0.14 mole) of dimethylamine had been evolved and collected in the cold trap. This corresponds to 78% of the theoretical dimethylamine available. Distillation of the residue yielded 2.77 g. of 2-dimethylamino - 1,3 - dimethyl - 1,3,2 - diazaborinane, B.P. 36° C./0.1 mm.

*Analysis.*—Found: B, 6.5; N, 27.1. $C_7H_{18}BN_3$ requires: B, 7.0; N, 27.1%.

*Example 2*

A mixture of N,N′-dimethyltrimethylenediamine (28.1 g.; 0.28 mole) and tris(dimethylamino)borane (25.4 g.; 0.18 mole) was heated in a similar apparatus for three hours at 170° C. followed by one hour at 200° C. A total of 22.9 g. (0.51 mole; 96% of theory) of dimethylamine was collected in the cold trap during the heating period. Distillation of the residue yielded two fractions, one of B.P. 29°–33° C./0.7 mm., of which 4.75 g. was obtained, believed to be 2-dimethylamino-1,3-dimethyl - 1,3,2 - diazaborinane, and a second (16.7 g., yield 56.7%) boiling at 136° C./0.03 mm., M.P. 39–40.5° C., which was identified as N,N′-dimethyl-N,N′-bis(1,3 - dimethyl - 1,3,2 - diazaborinyl) - trimethylenediamine.

*Analysis.*—Found: C, 54.3; H, 11.7; B, 6.8; N, 25.8%; M=335. $C_{15}H_{36}B_2N_6$ requires: C, 55.9; H, 11.3; B, 6.7; N, 26.1%; M=322.

An intermediate fraction (6.1 g.) was collected at 82–87° C./0.05 mm., and assumed to be the corresponding compound of type III, N,N′-dimethyl-N-(1,3-dimethyl-1,3,2-diazaborinyl)-trimethylenediamine.

*Example 3*

A mixture of tris(dimethylamino)borane (9.17 g.; 0.064 mole) and N,N′-diisopropylethylenediamine (14.11 g.; 0.10 mole) was heated for 12.5 hours at 170°–175° C. and for a further 5.5 hours at 200° C. Dimethylamine (6.8 g.; 0.15 mole; 79% of theory) was collected in a cold trap. Distillation of the residue yielded 8.2 g. (0.042 mole; 70%) of 2-dimethylamino-1,3-diisopropyl-1,3,2-diazaborolidine, B.P. 91.5° C./10 mm.

*Analysis.*—Found: B, 5.7; N, 21.0%; M=185. $C_{10}H_{24}BN_3$ requires: B, 5.5; N, 21.3%; M=197.

*Example 4*

A mixture of N,N′-diisopropylethylenediamine (37.1 g.; 0.26 mole) and tris(dimethylamino)borane (20.1 g.; 0.14 mole) was heated in the presence of 0.5 g. of methylammonium chloride to 140°–170° C. for 18 hours, during which time 16.8 g. (0.37 mole; 88.4% of theory) of dimethylamine was collected in a cold trap. Distillation of the residue yielded 20.6 g. (65%) of N,N′-diisopropyl - N,N′ - bis(1,3 - diisopropyl - 1,3,2 - diazaborolo)ethylenediamine, B.P. 140°–144° C./0.1 mm., M.P. 69–72° C.

*Analysis.*—Found: B, 5.1; N, 18.0%; M=440. $C_{24}H_{54}B_2N_6$ requires: B, 4.8; N, 18.7%; M=448.

*Example 5*

A mixture of tris(dimethylamino)borane (11.0 g.; 0.08 mole), N,N′-di-t-butylethylenediamine (13.3 g.; 0.08 mole) and 0.5 g. of methylammonium chloride was heated for 5 hours at 150° C. followed by 24 hours at 170° C. During this time 6.7 g. (0.15 mole; 97% of theory) of dimethylamine was evolved. Distillation of the residue yielded 13.1 g. (75.5%) of 2-dimethylamino-1,3-di-t-butyl-1,3,2-diazaborolidine, B.P. 92°–94° C./5 mm.

*Analysis.*—Found: B, 4.9; N, 18.2. $C_{12}H_{28}BN_3$ requires: B, 4.8; N, 18.6%.

Other modes of applying the principle of the invention may be employed, change being made as regards the details described, provided the features stated in any of the following claims or the equivalent of such be employed.

We, therefore, particularly point out and distinctly claim as our invention:

1. The compounds represented by the formulae

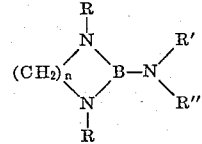

and

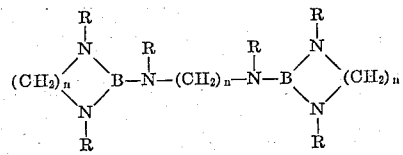

wherein R is selected from the group consisting of alkyl of 1 to 8 carbon atoms, cycloalkyl of 5–7 carbon atoms, phenyl, lower alkylphenyl, lower alkoxyphenyl, and halophenyl; R′ is selected from the group consisting of hydrogen and alkyl of 1 to 5 carbon atoms; R″ is alkyl of one to five carbon atoms; and $n$ is an integer selected from 2 and 3.

2. 2-dimethylamino-1,3-dimethyl-1,3,2-diazaborinane.

3. N,N'-dimethyl-N,N'-bis(1,3 - dimethyl - 1,3,2 - diazaborinyl)-trimethylenediamine.

4. 2-dimethylamino-1,3-diisopropyl-1,3,2 - diazaborolidine.

5. N,N'-diisopropyl-N,N'-bis(1,3 - diisopropyl - 1,3,2-diazaborolo)ethylenediamine.

6. 2 - dimethylamino - 1,3 - di - tert. - butyl-1,3,2-diazaborolidine.

7. The process for producing aminoboranes of the formulae $$(CH_2)_n \begin{array}{c} R \\ | \\ N \\ N \\ | \\ R \end{array} B-N \begin{array}{c} R' \\ \\ R'' \end{array}$$

and $$(CH_2)_n \begin{array}{c} R \\ | \\ N \\ N \\ | \\ R \end{array} B-N-(CH_2)_n-N-B \begin{array}{c} N \\ | \\ R \\ \\ N \\ | \\ R \end{array} (CH_2)_n$$

which comprises heating at a temperature of 100°–210° C. a mixture of a diamine of the formula $$RNH-(CH_2)_n-NHR$$

and a tris(alkylamino)borane of the formula $$\left(R'R''N\right)_3-B$$

in the absence of water and free oxygen, separating byproduce amine as it is formed, and isolating aminoborane from the reaction mixture, wherein R is selected from the group consisting of alkyl of 1 to 8 carbon atoms, cycloalkyl of 5–7 carbon atoms, phenyl, lower alkylphenyl, lower alkoxyphenyl, and halophenyl; R' is selected from the group consisting of hydrogen and alkyl of 1 to 5 carbon atoms; R" is alkyl of 1 to 5 carbon atoms; and $n$ is an integer selected from 2 and 3.

8. The process for producing an aminoborane of the formula $$(CH_2)_n \begin{array}{c} R \\ | \\ N \\ N \\ | \\ R \end{array} B-N \begin{array}{c} R' \\ \\ R'' \end{array}$$

which comprises heating at a temperature of 100°–210° C., substantially equimolar amounts of a tris(alkylamino)borane of the formula $$\left(R'R''N\right)_3-B$$

and a diamine of the formula $RNH-(CH_2)_n-NHR$ in the absence of water and free oxygen, separating by-product amine as it is formed until about two molecular proportions have been removed, and isolating said aminoborane from the reaction mixture, wherein R is selected from the group consisting of alkyl of 1 to 8 carbon atoms, cycloalkyl of 5–7 carbon atoms, phenyl, lower alkylphenyl, lower alkoxyphenyl, and halophenyl; R' is selected from the group consisting of hydrogen and alkyl of 1 to 5 carbon atoms; R" is an alkyl of 1 to 5 carbon atoms; and $n$ is an integer selected from 2 and 3.

9. The process for producing an aminoborane of the formula $$(CH_2)_n \begin{array}{c} R \\ | \\ N \\ N \\ | \\ R \end{array} B-N-(CH_2)_n-N-B \begin{array}{c} N \\ | \\ R \\ \\ N \\ | \\ R \end{array} (CH_2)_n$$

which comprises heating at a temperature of 100°–210° C. a mixture of a diamine of the formula $$RNH-(CH_2)_n-NHR$$

and a tris(alkylamino)borane of the formula $$\left(R'R''N\right)_3-B$$

in a diamine:borane molar ratio of about 3:2 and in the absence of water and free oxygen, separating by-product amine as it is formed, and isolating said aminoborane from the reaction mixture, wherein R is selected from the group consisting of alkyl of 1 to 8 carbon atoms, cycloalkyl of 5–7 carbon atoms, phenyl, lower alkylphenyl, lower alkoxyphenyl, and halophenyl; R' is selected from the group consisting of hydrogen and alkyl of 1 to 5 carbon atoms; R" is an alkyl of 1 to 5 carbon atoms; and $n$ is an integer selected from 2 and 3.

10. The process of claim 7 in which said mixture is heated at a temperature of 140°–200° C.

11. The process of claim 7 in which said mixture is heated in the presence of a catalytic amount of amine salt of a mineral acid.

12. The process of claim 9 in which said mixture is heated in the presence of a catalytic amount of amine salt of a mineral acid.

13. The process of claim 8 in which the reactants are heated at a temperature of 140°–200° C.

14. The process of claim 9 in which said mixture is heated at a temperature of 140°–200° C.

15. A compound of the formula:

$$(CH_2)_2 \begin{array}{c} Alkyl \\ | \\ N \\ N \\ | \\ Alkyl \end{array} B-N \begin{array}{c} Alkyl \\ \\ Alkyl \end{array}$$

wherein Alkyl is a lower alkyl group.

16. A compound of the formula:

$$(CH_2)_2 \begin{array}{c} Alkyl \\ | \\ N \\ N \\ | \\ Alkyl \end{array} B-N-(CH_2)_2-N-B \begin{array}{c} N \\ | \\ Alkyl \\ \\ N \\ | \\ Alkyl \end{array} (CH_2)_2$$

wherein Alkyl is a lower alkyl group.

References Cited by the Examiner

UNITED STATES PATENTS 3,117,139   1/64   Mooradian _____ 260—240 X

FOREIGN PATENTS

Niedenzu et al.: Inorg. Chem., vol. 1, No. 4, pp. 738–742 (1962).

WALTER A. MODANCE, *Primary Examiner.*

JOHN RANDOLPH, *Examiner.*